United States Patent
Osawa

(10) Patent No.: US 8,077,444 B2
(45) Date of Patent: Dec. 13, 2011

(54) MULTILAYER CAPACITOR

(75) Inventor: Shinichi Osawa, Kirishima (JP)

(73) Assignee: Kyocera Corporation, Kyoto (JP)

( * ) Notice: Subject to any disclaimer, the term of this patent is extended or adjusted under 35 U.S.C. 154(b) by 288 days.

(21) Appl. No.: 12/446,563

(22) PCT Filed: Oct. 17, 2007

(86) PCT No.: PCT/JP2007/070285
§ 371 (c)(1),
(2), (4) Date: Apr. 21, 2009

(87) PCT Pub. No.: WO2008/050657
PCT Pub. Date: May 2, 2008

(65) Prior Publication Data
US 2010/0321860 A1 Dec. 23, 2010

(30) Foreign Application Priority Data

Oct. 24, 2006 (JP) .................. 2006-289168

(51) Int. Cl.
*H01G 4/005* (2006.01)
*H01G 4/228* (2006.01)

(52) U.S. Cl. ....................... 361/303; 361/309

(58) Field of Classification Search .......... 361/303, 361/311, 306.3, 309
See application file for complete search history.

(56) References Cited

U.S. PATENT DOCUMENTS

| 7,310,217 B2 * | 12/2007 | Takashima et al. ........ 361/306.3 |
| 2004/0150941 A1 | 8/2004 | Kuroda et al. ............ 361/306.3 |
| 2007/0279836 A1 | 12/2007 | Takashima et al. ........ 361/306.3 |

FOREIGN PATENT DOCUMENTS

| JP | 06-034229 | 5/1994 |
| JP | 2004-235556 | 8/2004 |
| JP | 2004-296940 | 10/2004 |
| JP | 2006-203168 | 8/2006 |

OTHER PUBLICATIONS

Chinese language office action dated Jul. 14, 2010 and its English language translation for corresponding Chinese application 200780039318.9.

* cited by examiner

*Primary Examiner* — Eric Thomas
(74) *Attorney, Agent, or Firm* — DLA Piper LLP (US)

(57) ABSTRACT

The invention relates to a multilayer capacitor capable of controlling ESR while maintaining the level of ESL low. A multilayer capacitor (10) includes a plurality of first and second internal capacitor electrodes (3, 4) which are formed inside a multilayer body (1) of rectangular parallelepiped shape constructed by stacking a plurality of rectangular dielectric layers (2) on top of one another in a stacking direction; first and second external relay electrodes (13, 14) which are disposed on left-hand and right-hand surfaces of the multilayer body (1); first and second internal relay electrodes (5, 6) which are disposed inside the multilayer body (1) and arranged so as to be opposed to each other with the dielectric layer (2) interposed therebetween; and first and second external terminal electrodes (15, 16) which are disposed on upper and lower surfaces of the multilayer body (1).

6 Claims, 6 Drawing Sheets

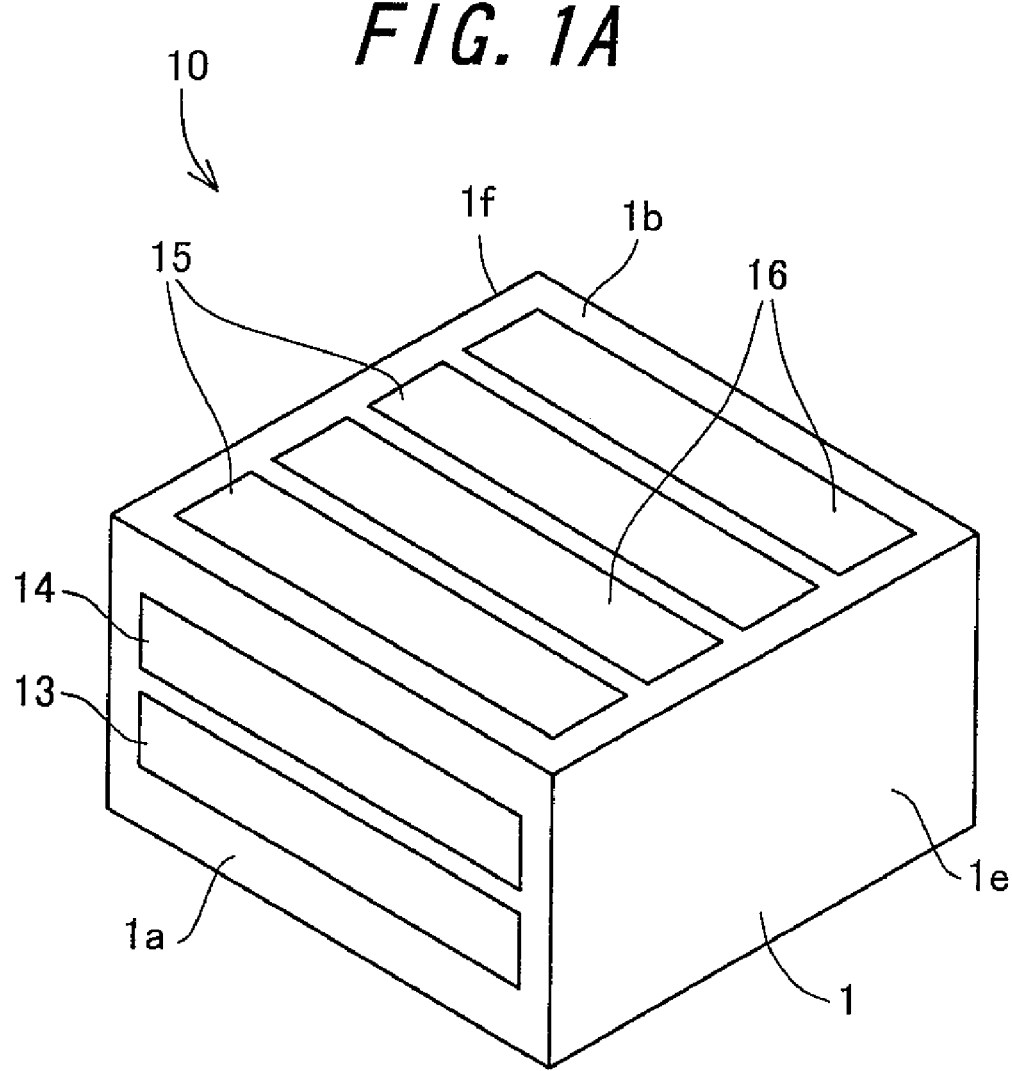

MULTILAYER CAPACITOR

TECHNICAL FIELD

The present invention relates to a multilayer capacitor that is suitable for use in a decoupling circuit or the like for stabilizing power supply current which is supplied to a power terminal of an IC.

BACKGROUND ART

Heretofore, it has been customary to connect a decoupling circuit between an IC and a power source in parallel relation to the IC so that, out of power source current, an alternating current component is diverted by the decoupling circuit to supply only a direct current component to the IC. Such a function of the decoupling circuit can be attained by decreasing the impedance of the decoupling circuit below a predetermined value over a wide band of frequencies ranging from low frequencies to high frequencies. In general, the decoupling circuit is composed of a plurality of capacitors. Since the capacitor has, in addition to an electrostatic capacitance, an equivalent series inductance (hereafter referred to as "ESL"), it follows that the impedance is low only in a band of frequencies close to a self-resonant frequency yielded by the ESL and the electrostatic capacitance. Therefore, the decoupling circuit has usually been constructed by arranging a plurality of capacitors having different self-resonant frequencies in parallel with each other. A reduction in the circuitry size of the decoupling circuit cannot be achieved without reducing the number of constituent capacitors. To that end it is preferable to employ a capacitor which allows attainment of a wide frequency band with low impedance on its own. For example, a multilayer capacitor has hitherto been preferably used for a decoupling circuit.

FIG. 4 is a perspective view showing the external appearance of one example of a conventional multilayer capacitor. For example, as disclosed in Japanese Unexamined Patent Publication JP-A 2004-296940, there is known a multilayer capacitor 40, as one that has conventionally been used for a decoupling circuit, which includes: a multilayer body 41 of rectangular parallelepiped shape constructed by stacking a plurality of rectangular dielectric layers 42 on top of one another in a stacking direction; a first internal electrode and a second internal electrode (not shown), disposed in a plural number, arranged in an alternating manner so as to be opposed to each other, with the dielectric layer 42 interposed therebetween inside the multilayer body 41; and a first external electrode 45 and a second external electrode 46 for establishing electrical connection between the first internal electrodes, as well as between the second internal electrodes, which are so formed as to extend from a left-hand surface and a right-hand surface, respectively, of the multilayer body 41 that are perpendicular to the stacking direction and a direction parallel with a longitudinal direction of the dielectric layer 42, along the stacking direction, over both of an upper surface and a lower surface of the multilayer body 41 that are perpendicular to the stacking direction and a direction parallel with a width direction perpendicular to the longitudinal direction of the dielectric layer 42. In this construction, one of the upper surface and the lower surface of the multilayer body 41 serves as a mounting surface.

In the multilayer capacitor 40 thus constructed, a plurality of electrostatic capacitances, each of which is formed between the first internal electrode and the second internal electrode, are arranged in parallel with one another to thereby obtain higher electrostatic capacitance. Moreover, by designing the upper and lower surfaces of the multilayer body 41 as a mounting surface, it is possible to shorten a path over which an electric current flows in each of the first internal electrode and the second internal electrode, and thereby lower the level of ESL. In the meantime, it is known that the impedance of the capacitor becomes the minimum at the self-resonant frequency, is substantially inversely proportional to the electrostatic capacitance at frequencies lower than the self-resonant frequency, and is substantially proportional to the ESL at frequencies higher than the self-resonant frequency. With consideration given to these facts, in the multilayer capacitor 40, in the presence of high electrostatic capacitance and low ESL, the impedance can be kept low over a wide band of frequencies, from a range of frequencies lower than the self-resonant frequency to a range of frequencies higher than the self-resonant frequency. It will thus be seen that the multilayer capacitor 40 allows attainment of a wide frequency band with low impedance on its own. Accordingly, it can be said that the multilayer capacitor 40 is suitably adopted for use in a decoupling circuit.

In the conventional multilayer capacitor 40 thus far described, however, since the electric current flow path is shortened to lower the level of ESL, it follows that the level of an equivalent series resistance (hereafter referred to as "ESR") is lowered. In this case, the impedance at frequencies close to the self-resonant frequency is unduly low. FIG. 5 is a chart showing impedance characteristics as observed in a decoupling circuit. In the chart, the abscissa axis represents frequency (unit: MHz) and the ordinate axis represents impedance |Z| (unit: Ω). A characteristic curve x and a characteristic curve y each indicated by a broken line in the chart represent the impedance characteristics of two different capacitors, respectively, for constituting the decoupling circuit. A characteristic curve z indicated by a solid line represents the impedance characteristic of the decoupling circuit. As shown in FIG. 5, in a case where a plurality of such multilayer capacitors 40 are used in the decoupling circuit, the impedance characteristic of the decoupling circuit becomes such that the impedance is unduly high at frequencies close to an antiresonant frequency r formed by the two capacitors that are close in self-resonant frequency to each other. In such a decoupling circuit, the impedance is caused to vary significantly according to frequency. Therefore, depending upon frequency, there arises the problem that the decoupling circuit is incapable of diverting an alternating current component of power source current.

In order to solve such a problem, it will be necessary to exercise ESR control in such a manner as to prevent the level of ESR from becoming too low in a capacitor designed for use in a decoupling circuit. However, if the level of ESR is raised simply by lengthening the electric current path, there will arise the problem that the level of ESL is also raised. In the alternative, the ESR level can be raised simply by making the electric current path narrower. However, even if this method is adopted, the problem of high ESL level still exists. For example, in the conventional multilayer capacitor 40 described above, if the interval between the first external electrode 45 and the second external electrode 46 is increased to lengthen the path over which an electric current flows in each of the first internal electrode and the second internal electrode, although the ESR level can be raised, the ESL level will inevitably become high at the same time.

DISCLOSURE OF THE INVENTION

The invention has been devised in view of the problems associated with the conventional multilayer capacitor such as described hereinabove, and an object of the invention is to provide a multilayer capacitor capable of controlling ESR while maintaining the level of ESL low.

The invention provides a multilayer capacitor comprising:

a multilayer body of rectangular parallelepiped shape constructed by stacking a plurality of rectangular dielectric layers on top of one another in a stacking direction;

a first internal capacitor electrode and a second internal capacitor electrode, which are disposed in a plural number, arranged in an alternating manner so as to be opposed to each other, with the dielectric layer interposed therebetween inside the multilayer body, the first internal capacitor electrode and the second internal capacitor electrode each having capacitor electrode lead-out portions led out to a left-hand surface and a right-hand surface, respectively, of the multilayer body that are perpendicular to the stacking direction and a direction parallel with a longitudinal direction of the dielectric layer;

a first external relay electrode formed on each of the left-hand surface and the right-hand surface of the multilayer body, to which is connected the capacitor electrode lead-out portion of the first internal capacitor electrode;

a second external relay electrode formed on each of the left-hand surface and the right-hand surface of the multilayer body, to which is connected the capacitor electrode lead-out portion of the second internal capacitor electrode;

a first internal relay electrode disposed between dielectric layers different from the dielectric layers corresponding to the first internal capacitor electrode and the second internal capacitor electrode inside the multilayer body, which has relay electrode lead-out portions led out to the left-hand surface and the right-hand surface, respectively, and connected to the first external relay electrode, and also has extension portions extended to an upper surface and a lower surface, respectively, of the multilayer body that are perpendicular to the stacking direction and a direction parallel with a width direction perpendicular to the longitudinal direction of the dielectric layer;

a second internal relay electrode disposed between dielectric layers different from the dielectric layers corresponding to the first internal capacitor electrode and the second internal capacitor electrode so as to be opposed to the first internal relay electrode, with the dielectric layer interposed therebetween, inside the multilayer body, which has relay electrode lead-out portions led out to the left-hand surface and the right-hand surface, respectively, and connected to the second external relay electrode, and also has extension portions extended to the upper surface and the lower surface, respectively, of the multilayer body;

a first external terminal electrode formed on each of the upper surface and the lower surface of the multilayer body, to which is connected the extension portion of the first internal relay electrode; and a second external terminal electrode formed on each of the upper surface and the lower surface of the multilayer body, to which is connected the extension portion of the second internal relay electrode.

According to the invention, in the presence of the first internal relay electrode disposed between the first internal capacitor electrode and the first external terminal electrode, and the second internal relay electrode disposed between the second internal capacitor electrode and the second external terminal electrode, the electric current path within the multilayer capacitor can be made longer and the ESR of the multilayer capacitor is thus significantly increased. When it is desired to reduce the amount of increase in the ESR, the numbers of, respectively, the first internal relay electrode and the second internal relay electrode are increased to increase resistive components in parallel. Although the first internal relay electrode and the second internal relay electrode each have an inductance, since they are arranged so as to be opposed to each other with the dielectric layer interposed therebetween, the inductance of the first internal relay electrode and the inductance of the second internal relay electrode cancel each other out. This makes it possible to keep the level of ESL low in the multilayer capacitor. In this way, according to the multilayer capacitor embodying the invention, ESR control can be exercised properly while maintaining the level of ESL low.

Moreover, the first external terminal electrode and the second external terminal electrode are formed on both of the upper surface and the lower surface of the multilayer body. That is, any one of the upper surface and the lower surface of the multilayer body can be used as a mounting surface which is opposed to a circuit board. This makes it possible to permit easing of constraints in terms of a direction in which the multilayer capacitor is mounted on the circuit board. Further, the multilayer body is constructed by stacking a plurality of rectangular dielectric layers on top of one another in the stacking direction. In this construction, the distance between the mounting surface, namely the upper surface as well as the lower surface, and the center of gravity of the multilayer body is shorter than the distance between the left-hand surface, as well as the right-hand surface, and the center of gravity of the multilayer body. This results in the advantage that the multilayer capacitor is hardly caused to topple over when mounted on the circuit board.

Moreover, in the invention, it is preferable that the first external terminal electrode and the second external terminal electrode, which are respectively disposed in a plural number, are arranged in an alternating manner.

According to the invention, in a case where the first external terminal electrode and the second external terminal electrode, which are respectively disposed in a plural number, are arranged in an alternating manner, an electric current flowing from the first internal relay electrode toward the first external terminal electrode and an electric current flowing from the second internal relay electrode toward the second external terminal electrode break up to eventually create a plurality of electric current paths, which results in lowness of inductance. Further, inductances encountered by electric currents flowing through the extension portion of the first internal relay electrode and the extension portion of the second internal relay electrode, respectively, that are adjacent to each other cancel each other out. In this way, besides being lowered by the scattering of electric currents, the inductances are subjected to cancellation. This makes it possible to keep the level of ESL low.

Moreover, in the invention, it is preferable that the first internal capacitor electrode, the second internal capacitor electrode, the first internal relay electrode, and the second internal relay electrode are rotationally symmetrical with respect to an axis of symmetry passing through the center of front and rear surfaces of the multilayer body that are perpendicular to the stacking direction.

According to the invention, the first internal capacitor electrode, the second internal capacitor electrode, the first internal relay electrode, and the second internal relay electrode are rotationally symmetrical with respect to the axis of symmetry passing through the center of the front and rear surfaces of the multilayer body. In this case, the characteristics of the multilayer capacitor remain unchanged regardless of which one of the upper and lower surfaces of the multilayer body is used as a mounting surface. Accordingly, it is possible to permit easing of constraints in terms of the direction in which the multilayer capacitor is mounted on the circuit board.

Moreover, in the invention, it is preferable that the first external relay electrode and the second external relay electrode are made smaller in width than the first external terminal electrode and the second external terminal electrode.

According to the invention, in a case where the first external relay electrode and the second external relay electrode are made smaller in width than the first external terminal electrode and the second external terminal electrode, it is possible to reduce the areas of, respectively, the left-hand and right-hand surfaces, and thereby render the multilayer capacitor lower in profile.

Moreover, in the invention, it is preferable that an interval between the first external relay electrode and the second external relay electrode is shorter than an interval between the first external terminal electrode and the second external terminal electrode.

According to the invention, in a case where the interval between the first external relay electrode and the second external relay electrode is shorter than the interval between the first external terminal electrode and the second external terminal electrode, it is possible to reduce the areas of, respectively, the left-hand and right-hand surfaces, and thereby render the multilayer capacitor lower in profile. In addition to that, it is also possible to enhance the effect of causing the inductances encountered by the electric currents flowing through the first external relay electrode and the second external relay electrode, respectively, to cancel each other out, and thereby lower the level of ESL even further.

Moreover, in the invention, it is preferable that a plurality of pairs of the first internal relay electrode and the second internal relay electrode are arranged at equally spaced intervals in the stacking direction of the multilayer body.

According to the invention, in a case where a plurality of pairs of the first internal relay electrode and the second internal relay electrode are arranged at equally spaced intervals in the stacking direction of the multilayer body, it is possible to lessen variations in impedance in a frequency band with low impedance in the multilayer capacitor.

BRIEF DESCRIPTION OF DRAWINGS

Other and further objects, features, and advantages of the invention will be more explicit from the following detailed description taken with reference to the drawings wherein:

FIG. 1A is a perspective view showing the external appearance of a multilayer capacitor in accordance with one embodiment of the invention;

BEST MODE FOR CARRYING OUT THE INVENTION

Figure 1B:
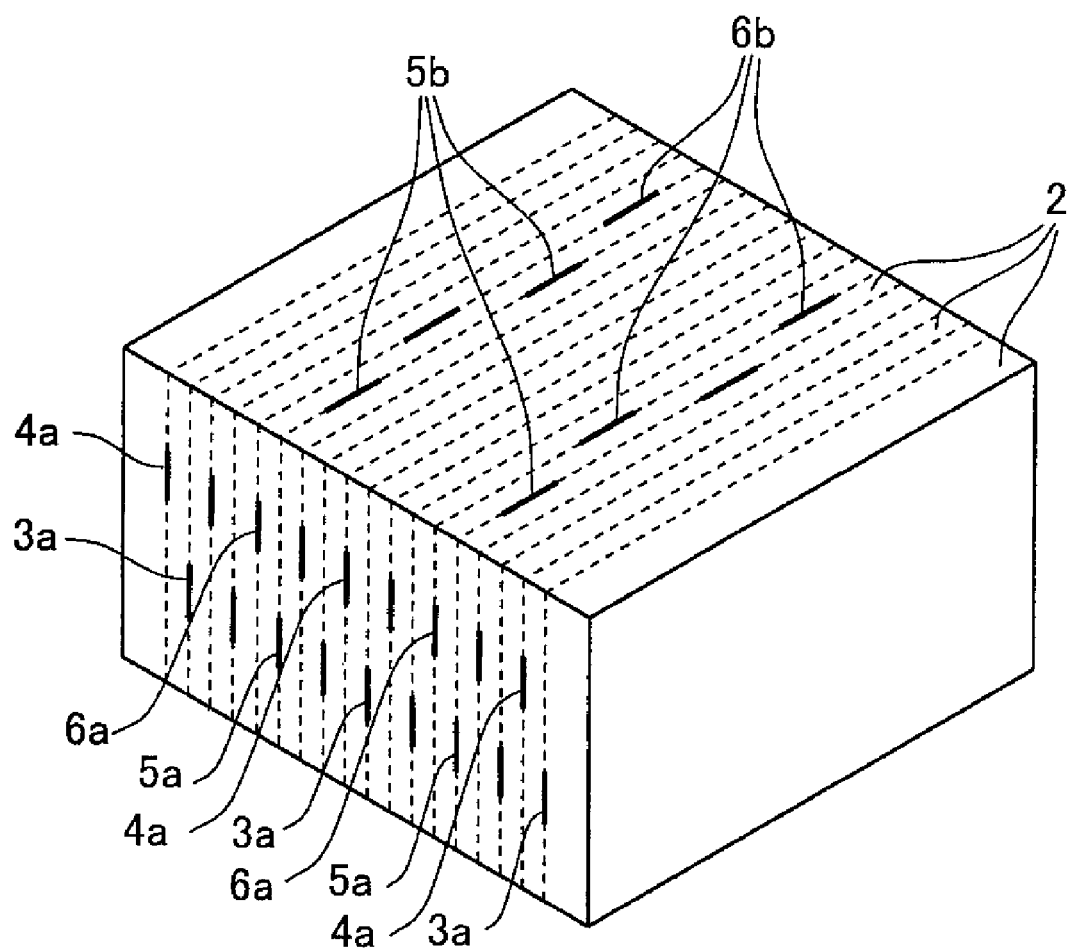
FIG. 1B is a perspective view showing the external appearance of the multilayer capacitor depicted in FIG. 1A, with the first external relay electrode, the second external relay electrode, the first external terminal electrode, and the second external terminal electrode removed.
Figure 2A:
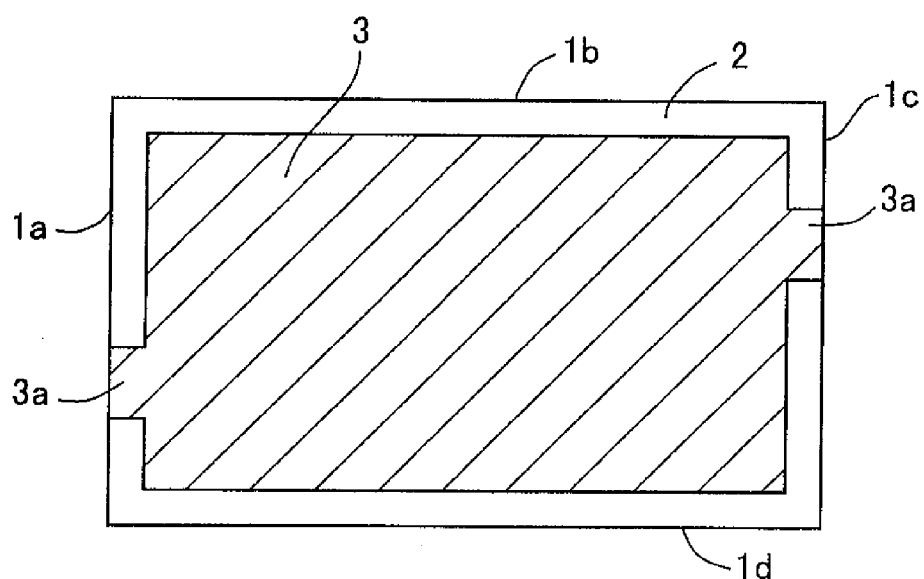
FIG. 2A is a plan view of the dielectric layer of the multilayer capacitor of FIG. 1 in which is formed the first internal capacitor electrode, as viewed from the front of the multilayer body.
Figure 2B:
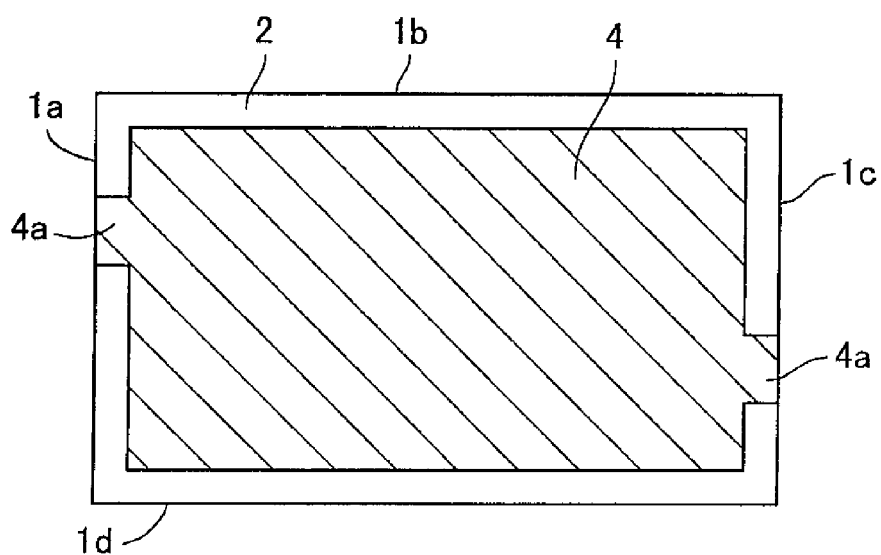
FIG. 2B is a plan view of the dielectric layer of the multilayer capacitor of FIG. 1 in which is formed the second internal capacitor electrode, as viewed from the front of the multilayer body.
Figure 2C:
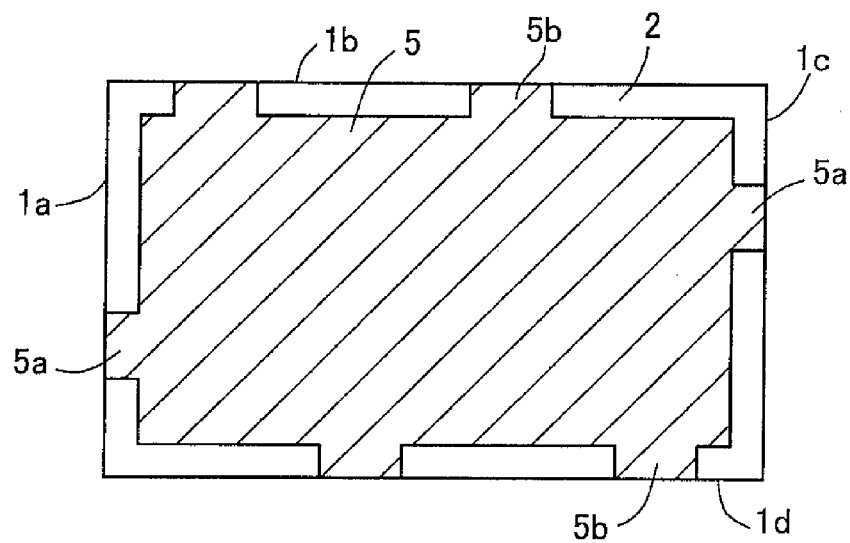
FIG. 2C is a plan view of the dielectric layer of the multilayer capacitor of FIG. 1 in which is formed the first internal relay electrode, as viewed from the front of the multilayer body.
Figure 2D:
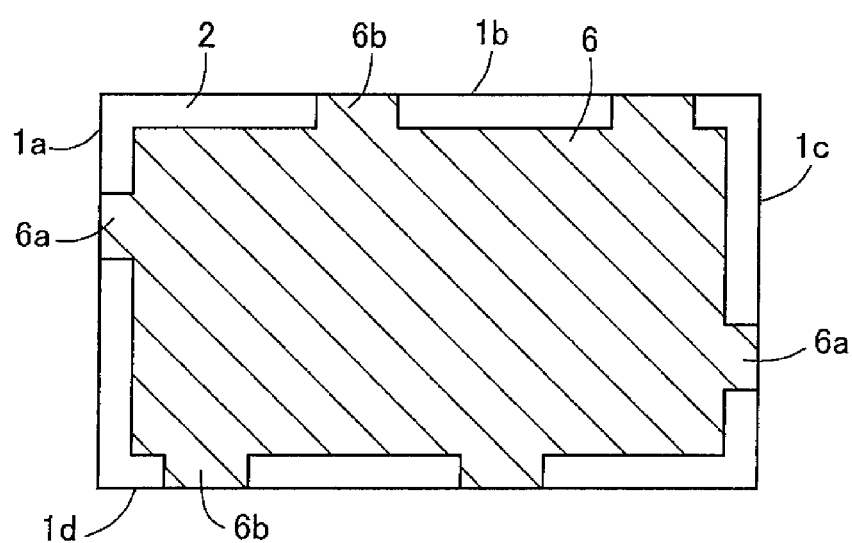
FIG. 2D is a plan view of the dielectric layer of the multilayer capacitor of FIG. 1 in which is formed the second internal relay electrode, as viewed from the front of the multilayer body.

Now referring to the drawings, preferred embodiments of the invention will be described in detail.

FIG. 1A is a perspective view showing the external appearance of a multilayer capacitor in accordance with one embodiment of the invention. FIG. 1B is a perspective view showing the external appearance of the multilayer capacitor depicted in FIG. 1A, with a first external relay electrode, a second external relay electrode, a first external terminal electrode, and a second external terminal electrode removed. FIGS. 2A through 2D are plan views of dielectric layers of the multilayer capacitor of FIG. 1 in which are formed a first internal capacitor electrode, a second internal capacitor electrode, a first internal relay electrode, and a second internal relay electrode, respectively, as viewed from the front of the multilayer body. Generally speaking, the multilayer capacitor 10 according to the invention shown in these figures includes: a multilayer body 1 constructed by stacking a plurality of dielectric layers 2 on top of one another in a stacking direction; a first internal capacitor electrode 3 and a second internal capacitor electrode 4, which are disposed in a plural number, arranged in an alternating manner so as to be opposed to each other, with the dielectric layer 2 interposed therebetween inside the multilayer body 1; a first internal relay electrode 5 and a second internal relay electrode 6, which are disposed in a plural number, arranged in an alternating manner so as to be opposed to each other, with the dielectric layer 2 interposed therebetween inside the multilayer body 1; a first external relay electrode 13 and a second external relay electrode 14 formed on each of a right-hand surface and a left-hand surface of the multilayer body 1; and a first external terminal electrode 15 and a second external terminal electrode 16 formed on each of an upper surface and a lower surface of the multilayer body 1. Note that the right-hand surface and the left-hand surface of the multilayer body 1 are planes perpendicular to a direction perpendicular to the stacking direction and parallel with a longitudinal direction of the dielectric layer, and the upper surface and the lower surface of the multilayer body 1 are planes perpendicular to a direction that is perpendicular to the stacking direction and is parallel with a width direction perpendicular to the longitudinal direction of the dielectric layer.

The multilayer body 1 is a dielectric block of rectangular parallelepiped shape constructed by stacking a plurality of, for example; 70 to 1000 pieces of rectangular dielectric layers 2 on top of one another. Note that, in FIG. 1, the exact number of the dielectric layers 2 stacked together is not illustrated for the sake of simplicity in the explanation of this embodiment.

Each of the dielectric layers 2 is formed in a rectangle shape and ranges in thickness from 1 μm to 5 μm. A material used for the dielectric layer 2 is a dielectric material predominantly composed of ceramics having a relatively high dielectric constant, such for example as barium titanate, calcium titanate, and strontium titanate.

The first internal capacitor electrode 3 and the second internal capacitor electrode 4 are each so shaped that the periphery thereof is located inwardly a little distance away from the periphery of the dielectric layer 2 to maintain an external insulation, and the thickness of which falls within a range from 0.5 μm to 2 μm. A material used for the first internal capacitor electrode 3 and the second internal capacitor electrode 4 is a conductor material predominantly composed of a metal such for example as nickel, copper, nickel-copper, and silver-palladium. The first internal capacitor electrode 3 has capacitor electrode lead-out portions 3a led out to the left-hand surface 1a and the right-hand surface 1c, respectively, of the multilayer body 1. The second internal capacitor electrode 4 has capacitor electrode lead-out portions 4a led out to the left-hand surface 1a and the right-hand surface 1c, respectively, of the multilayer body 1.

The first external relay electrode 13 and the second external relay electrode 14 are formed on each of the left-hand surface 1a and the right-hand surface 1c of the multilayer body 1 in the shape of a 2 μm to 70 μm-thick strip extending in the stacking direction of the multilayer body 1. A material used for the first external relay electrode 13 and the second external relay electrode 14 is a conductor material predominantly composed of a metal such for example as nickel, copper, silver, and palladium. The capacitor electrode lead-out portion 3a of the first internal capacitor electrode 3 is connected to the first external relay electrode 13, and the capacitor electrode lead-out portion 4a of the second internal capacitor electrode 4 is connected to the second external relay electrode 14.

Just like the first internal capacitor electrode 3 and the second internal capacitor electrode 4, the first internal relay electrode 5 and the second internal relay electrode 6 are each so shaped that the periphery thereof is located inwardly a little distance away from the periphery of the dielectric layer 2, and the thickness of which falls within a range from 0.5 μm to 2 μm. A material used for the first internal relay electrode 5 and the second internal relay electrode 6 is, just as in the case of the first internal capacitor electrode 3 and the second internal capacitor electrode 4, a conductor material predominantly composed of a metal such for example as nickel, copper, nickel-copper, and silver-palladium.

Moreover, the first internal relay electrode 5 and the second internal relay electrode 6 are so arranged as to be opposed to each other, with the dielectric layer 2 interposed therebetween, in a region between the dielectric layers 2 different from those corresponding to the first internal capacitor electrode 3 and the second internal capacitor electrode 4. The first internal relay electrode 5 has relay electrode lead-out portions 5a led out to the left-hand surface 1a and the right-hand surface 1c, respectively, of the multilayer body 1 and connected to the first external relay electrode 13, and in addition has extension portions 5b extended to the upper surface 1b and the lower surface 1d of the multilayer body 1, respectively, of the multilayer body 1. The second internal relay electrode 6 has relay electrode lead-out portions 6a led out to the left-hand surface 1a and the right-hand surface 1c, respectively, of the multilayer body 1 and connected to the second external relay electrode 14, and in addition has extension portions 6b extended to the upper surface 1b and the lower surface 1d, respectively, of the multilayer body 1.

Note that, in the multilayer capacitor 10 according to the invention, the dielectric layers 2 that are interposed among the first internal capacitor electrode 3, the second internal capacitor electrode 4, the first internal relay electrode 5, and the second internal relay electrode 6 function as effective layers. On the other hand, the dielectric layers 2 that are not interposed among the first internal capacitor electrode 3, the second internal capacitor electrode 4, the first internal relay electrode 5, and the second internal relay electrode 6 and are arranged on the front-surface side and the rear-surface side, respectively, of the multilayer body 1 function as protective layers. Note also that the front surface and the rear surface of the multilayer body 1 are planes perpendicular to the stacking direction of the multilayer body 1.

The first external terminal electrode 15 and the second external terminal electrode 16 are formed on each of the left-hand surface 1a and the right-hand surface 1c of the multilayer body 1 in the shape of a 2 μm to 70 μm-thick strip extending in the stacking direction. Connected to the first external terminal electrode 15 is the extension portion 5b of the first internal relay electrode 5. Connected to the second external terminal electrode 16 is the extension portion 6b of the second internal relay electrode 6. A material used for the first external terminal electrode 15 and the second external terminal electrode 16 is, just as in the case of the first external relay electrode 13 and the second external relay electrode 14, a conductor material predominantly composed of a metal such for example as nickel, copper, silver, and palladium. Note that, in order to ensure satisfactory connection with solder or the like used for mounting the multilayer capacitor on an external circuit board, it is preferable that each of the first external terminal electrode 15 and the second external terminal electrode 16 has its surface coated with a plating film for solder leaching prevention made of a conductor material such as nickel or the like. It is also preferable that on the foregoing plating film is additionally formed a plating film for solder wettability enhancement made of a conductor material such as tin, solder, gold, or the like.

Thus, with the provision of a plurality of the first internal capacitor electrodes 3 and the second internal capacitor electrodes 4 among which are interposed the dielectric layers 2 for a buildup of electrical charge, the multilayer capacitor 10 according to the invention succeeds in providing high electrostatic capacitance.

In the multilayer capacitor 10 according to the invention, in the presence of the first internal relay electrode 5 disposed between the first internal capacitor electrodes 3 and the first external terminal electrode 15, as well as the second internal relay electrode 6 disposed between the second internal capacitor electrodes 4 and the second external terminal electrode 16, the electric current path within the multilayer capacitor 10 can be made longer, wherefore the ESR of the multilayer capacitor 10 is significantly increased. For example, by setting the number of the first internal relay electrode 5 and the number of the second internal relay electrode 6 to be 5 or less, respectively, it is possible to increase the ESR greatly. When it is desired to keep the amount of increase in the ESR small, the numbers of, respectively, the first internal relay electrode 5 and the second internal relay electrode 6 are increased to increase resistive components in parallel arrangement. Although the first internal relay electrode 5 and the second internal relay electrode 6 each have an inductance, since they are arranged so as to be opposed to each other with the dielectric layer 2 interposed therebetween, it follows that the inductance of the first internal relay electrode 5 and the inductance of the second internal relay electrode 6 cancel each other out. This makes it possible to keep the level of ESL low in the multilayer capacitor 10 as a whole. In this way, according to the multilayer capacitor 10 embodying the invention, ESR control can be exercised properly while maintaining the level of ESL low.

As explained heretofore, by virtue of high electrostatic capacitance and low ESL, the multilayer capacitor 10 according to the invention allows attainment of a wide frequency band with low impedance. In addition, since control is carried out in such a manner as to prevent ESR from becoming too low, the multilayer capacitor 10 according to the invention is suitably adopted particularly for use in a decoupling circuit.

Moreover, the first external terminal electrode 15 and the second external terminal electrode 16 are formed on both of the upper surface 1b and the lower surface 1d of the multilayer body 1. That is, one of the upper surface 1b and the lower surface 1d of the multilayer body 1 can be used as a mounting surface which is opposed to the circuit board. This makes it possible to permit easing of constraints in terms of a direction in which the multilayer capacitor is mounted on the circuit board. Further, the multilayer body 1 is constructed by stacking the plurality of the rectangular dielectric layers 2 on top of one another in the stacking direction. In this construction, the distance between the mounting surface, namely the upper surface 1b, as well as the lower surface 1d, and the center of gravity of the multilayer body 1 is shorter than the distance between the left-hand surface 1a, as well as the right-hand surface 1c, and the center of gravity of the multilayer body 1. This results in the advantage that the multilayer capacitor 10 is hardly caused to topple over when mounted on the circuit board.

Moreover, in the multilayer capacitor 10 according to the invention, the first external terminal electrode 15 and the second external terminal electrode 16, which are respectively disposed in a plural number, are arranged in an alternating manner. In this construction, electric currents flowing from the first internal relay electrode 5 toward the first external terminal electrode 15 and electric currents flowing from the second internal relay electrode 6 toward the second external terminal electrode 16 break up to eventually create a plurality of electric current paths, in consequence whereof there results a decrease in inductance. Further, inductances encountered by electric currents flowing through the extension portion 5b of the first internal relay electrode 5 and the extension portion 6b of the second internal relay electrode 6, respectively, that are adjacent to each other cancel each other out. In this way, according to the multilayer capacitor 10 embodying the invention, a decrease in inductance can be achieved by, in addition to the scattering of electric currents, the mutual cancellation effect. This makes it possible to lower the level of ESL.

Moreover, in the multilayer capacitor 10 according to the invention, so long as the first internal capacitor electrode 3, the second internal capacitor electrode 4, the first internal relay electrode 5, and the second internal relay electrode 6 are designed to be rotationally symmetrical with respect to an axis of symmetry passing through the center of the front and rear surfaces 1e and 1f, the characteristics of the multilayer capacitor remain unchanged regardless of which one of the upper surface 1b and the lower surface 1d of the multilayer body 1 is used as a mounting surface. Accordingly, it is possible to permit easing of constraints in terms of the direction in which the multilayer capacitor is mounted on the circuit board.

Moreover, in the multilayer capacitor 10 according to the invention, it is preferable that the first external relay electrode 13 and the second external relay electrode 14 are made smaller in width than the first external terminal electrode 15 and the second external terminal electrode 16. In the case where the first external relay electrode 13 and the second external relay electrode 14 are made smaller in width than the first external terminal electrode 15 and the second external terminal electrode 16, it is possible to reduce the areas of, respectively, the left-hand surface 1a and the right-hand surface 1c, and thereby render the multilayer capacitor 10 lower in profile.

Moreover, in the multilayer capacitor 10 according to the invention, it is preferable that the interval between the first external relay electrode 13 and the second external relay electrode 14 is set to be shorter than the interval between the first external terminal electrode 15 and the second external terminal electrode 16. In the case where the interval between the first external relay electrode 13 and the second external relay electrode 14 is set to be shorter than the interval between the first external terminal electrode 15 and the second external terminal electrode 16, it is possible to reduce the areas of, respectively, the left-hand surface 1a and the right-hand surface 1c, and thereby render the multilayer capacitor 10 lower in profile. In addition to that, it is also possible to enhance the effect of causing the inductances encountered by electric currents flowing through the first external relay electrode 13 and the second external relay electrode 14, respectively, to cancel each other out, and thereby lower the level of ESL even further.

Moreover, in the multilayer capacitor 10 according to the invention, it is preferable that a plurality of pairs of the first internal relay electrode 5 and the second internal relay electrode 6 are arranged at equally spaced intervals in the stacking direction of the multilayer body 1. In the case where a plurality of pairs of the first internal relay electrode 5 and the second internal relay electrode 6 are arranged at equally spaced intervals in the stacking direction of the multilayer body 1, it is possible to lessen variations in impedance in a frequency band with low impedance in the multilayer capacitor 10. When, inside the multilayer body 1, there are formed 40 pieces of the first internal capacitor electrodes 3 and the second internal capacitor electrodes 4, respectively, and 5 pieces of the first internal relay electrodes 5 and the second internal relay electrodes 6, respectively, then a pair of the first internal relay electrode 5 and the second internal relay electrode 6, a group of 10 pieces of the first internal capacitor electrodes 3, and a group of 10 pieces of the second internal capacitor electrodes 4 are arranged in an alternating manner.

Next, a description will be given below as to a method of manufacturing the multilayer capacitor 10 according to the invention.

The multilayer body 1 of the multilayer capacitor 10 according to the invention is obtained by firing a precursor of the multilayer body 1 composed of dielectric material powder and an organic binder fabricated in advance so as to effect the sintering of ceramics. The method of formation of the precursor of the multilayer body 1 involves a step of producing a multilayer sheet by stacking together a plurality of 1 μm to 10 μm-thick ceramic green sheets, of which each has a plurality of rectangular-shaped regions arranged in a matrix corresponding to the dielectric layers 2, and a step of cutting the multilayer sheet along the boundaries of the rectangular-shaped regions corresponding to the dielectric layers 2.

In regard to the formation of the first internal capacitor electrode 3, the second internal capacitor electrode 4, the first internal relay electrode 5, and the second internal relay electrode 6 of the multilayer capacitor 10 according to the invention, at the time of forming the precursor of the multilayer body 1, conductor film patterns corresponding to the first internal capacitor electrode 3, the second internal capacitor electrode 4, the first internal relay electrode 5, and the second internal relay electrode 6, respectively, are formed in advance on the ceramic green sheets. In this way, following the completion of the firing of the precursor of the multilayer body 1, the first internal capacitor electrode 3, the second internal capacitor electrode 4, the first internal relay electrode 5, and the second internal relay electrode 6 can be obtained together with the multilayer body 1.

The first external relay electrode 13, the second external relay electrode 14, the first external terminal electrode 15, and the second external terminal electrode 16 can be formed by, for example, applying a conductor paste composed of conductor material powder and a vehicle prepared in advance around that parts of the multilayer body 1 on which are exposed the capacitor electrode lead-out portions 3a and 4a, the relay electrode lead-out portions 5a and 6a, and the extension portions 5b and 6b, and then baking it into predetermined configurations.

It is to be understood that the application of the invention is not limited to the examples of the embodiment described heretofore, and that various changes and modifications may be made without departing from the spirit and scope of the invention.

For example, while, in the above-described embodiment, the first external relay electrode 13 and the second external relay electrode 14 have their surfaces exposed on the left-hand and right-hand surfaces 1a and 1c of the multilayer body 1, they may have their surfaces covered with a protective film made of resin or the like. In this case, it is possible to impart insulation to the left-hand and right-hand surfaces 1a and 1c of the multilayer body 1, and thereby increase the packing density on the circuit board. As an alternative to the coating of a protective film made of resin or the like, the first external relay electrode 13 and the second external relay electrode 14 could have their surfaces subjected to oxidation to achieve the insulation.

Moreover, in the above-described embodiment, in order to form the first external relay electrode 13, the second external relay electrode 14, the first external terminal electrode 15, and the second external terminal electrode 16, the method involving application and baking of a conductor paste is adopted. However, the first external relay electrode 13, the second external relay electrode 14, the first external terminal electrode 15, and the second external terminal electrode 16 may be formed also by immersing the multilayer body 1 in an electroless copper plating solution to cause deposition of copper plating films around that parts of the multilayer body 1 on which are exposed the capacitor electrode lead-out portions 3a and 4a, the relay electrode lead-out portions 5a and 6a, and the extension portions 5b and 6b. In this case, a dummy electrode, which is led out to the upper and lower surfaces 1b and 1d of the multilayer body 1, may additionally be formed between the dielectric layers 2 so as to be connected to the first external terminal electrode 15 or the second external terminal electrode 16. This enables the first external terminal electrode 15 and the second external terminal electrode 16 to be firmly bonded to the multilayer body 1.

EXAMPLES

A test sample 1 having the following structure was fabricated by way of the multilayer capacitor 10 according to the invention.

The multilayer body 1 is produced in the form of a dielectric block of rectangular parallelepiped shape constructed by stacking together rectangular dielectric layers 2, each of which is 0.8 mm long and 1.6 mm wide, in the stacking direction so that the dimension of the dielectric block in the stacking direction is 1.6 mm. The material used for the dielectric layer 2 is ferroelectric ceramics predominantly composed of barium titanate. The first internal capacitor electrode 3 and the second internal capacitor electrode 4, which are each formed by using a conductor material predominantly composed of nickel and 100 in number, are arranged in an alternating manner within the multilayer body 1. The first internal relay electrode 5 and the second internal relay electrode 6, which are each formed by using a conductor material predominantly composed of nickel and 2 in number, are arranged in an alternating manner within the multilayer body 1. The first external relay electrode 13, the second external relay electrode 14, the first external terminal electrode 15, and the second external terminal electrode 16 are each formed by using copper as a material. On their respective surfaces are formed a nickel-made plating film, and on the foregoing plating film is further formed a tin-made plating film.

In addition, a test sample 2 of a conventional multilayer capacitor was fabricated by way of Comparative Example. In contrast to the test sample 1, the test sample 2 does not include the first internal relay electrode 5 and the second internal relay electrode 6. Moreover, in the test sample 2, the upper surface of the multilayer body 1 is used as a mounting surface. Otherwise, the test sample 2 is identical in shape and material with the test sample 1.

Figure 3:
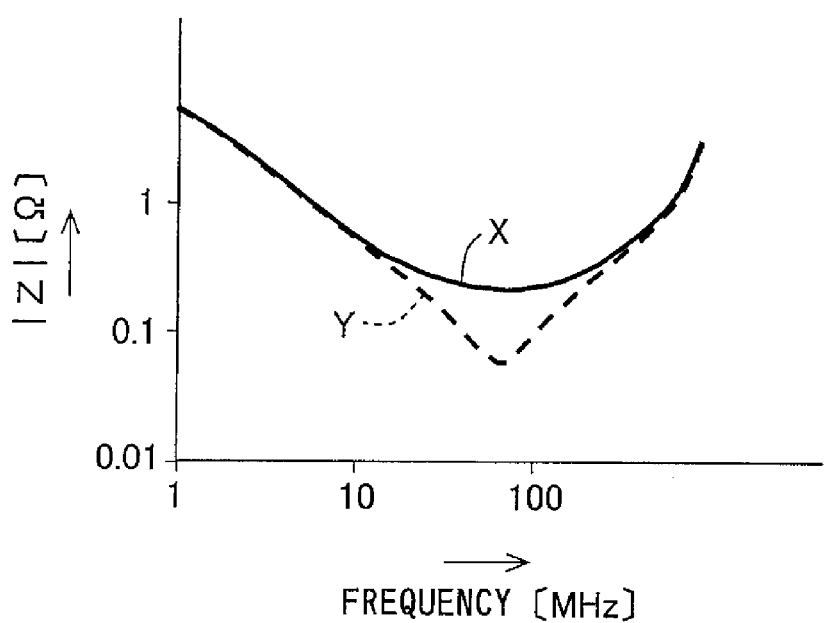
FIG. 3 is a chart showing impedance characteristics as observed in the multilayer capacitor.
Figure 4:
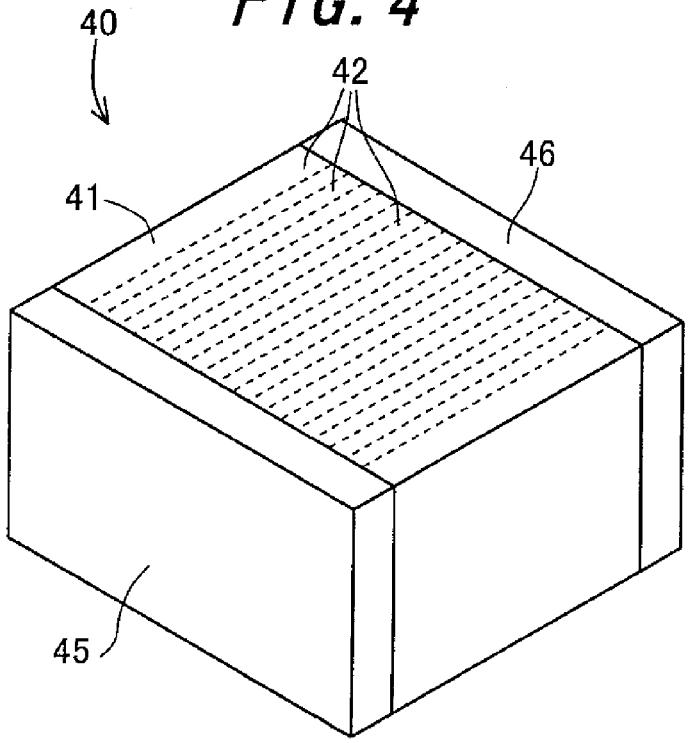
FIG. 4 is a perspective view showing the external appearance of one example of a conventional multilayer capacitor.
Figure 5:
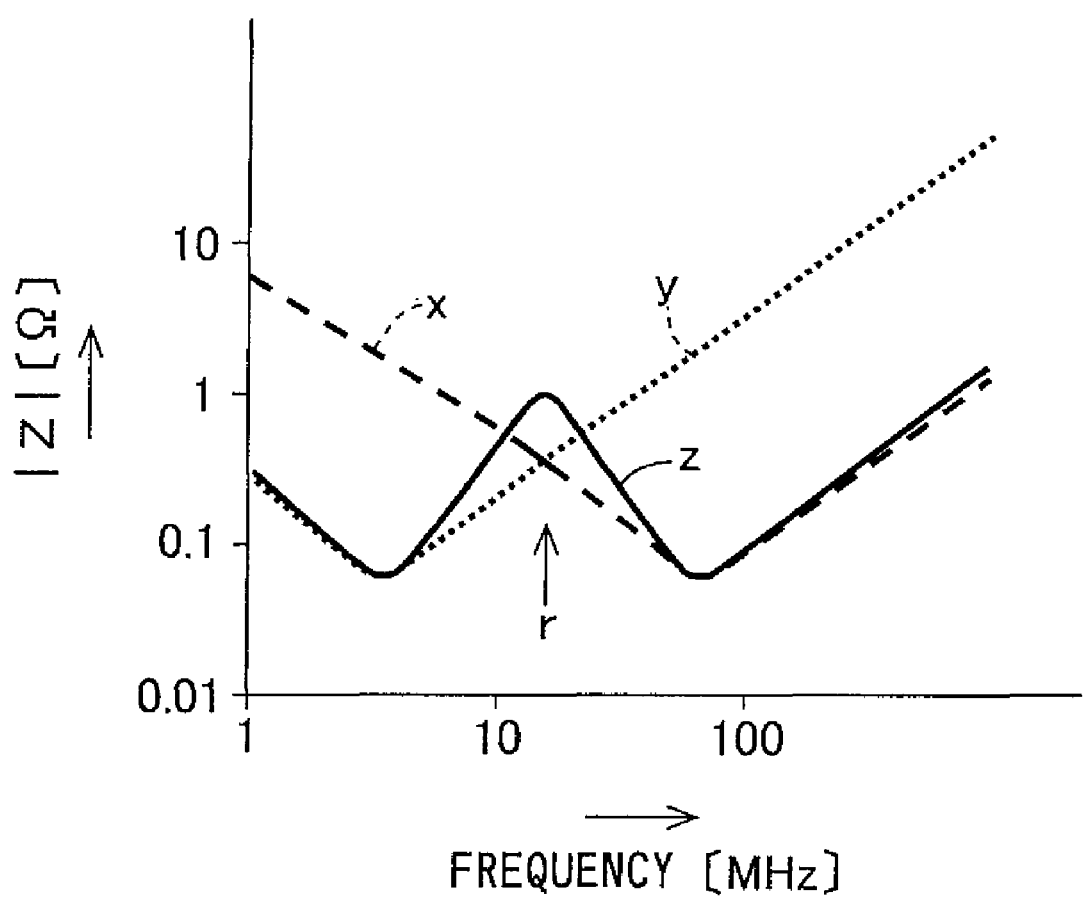
FIG. 5 is a chart showing impedance characteristics as observed in a decoupling circuit.

The test samples 1 and 2 were subjected to impedance measurement in a frequency band ranging from $1 \times 10^6$ Hz to $1 \times 10^9$ Hz. FIG. 3 is a chart showing impedance characteristics as observed in the multilayer capacitors. In the chart, the abscissa axis represents frequency (unit: MHz) and the ordinate axis represents impedance |Z| (unit: Ω). Moreover, in the chart, a characteristic curve X indicated by a solid line represents the impedance characteristic of the test sample 1 (the multilayer capacitor 10 according to the invention) and a characteristic curve Y indicated by a broken line represents the impedance characteristic of the test sample 2 (the conventional multilayer capacitor). Note that, here, a frequency band with lower-than-1 Ω impedance is defined as a practical frequency band.

As will be understood from the result of measurement shown in FIG. 3, the minimum value of impedance in the test sample 1 is more than three times as large as that in the test sample 2. This is because, in the test sample 1, with the provision of two pieces of the first internal relay electrodes 5 and two pieces of the second internal relay electrodes 6, the electric current path is lengthened, which results in the level of ESR being raised. Moreover, in the test sample 1, although the electric current path is made longer in the presence of the first internal relay electrodes 5 and the second internal relay electrodes 6, since the first internal relay electrode 5 and the second internal relay electrode 6 are arranged so as to be opposed to each other with the dielectric layer 2 interposed therebetween, it follows that the inductance occurring in the first internal relay electrode 5 and the inductance occurring in the second internal relay electrode 6 cancel each other out. Accordingly, the amount of increase in the ESL is reduced, with the result that the impedance characteristic of the test sample 1 varies little in a range of frequencies higher than those close to the self-resonant frequency.

It has been confirmed from the foregoing result that, according to the multilayer capacitor embodying the invention, in the presence of the first internal relay electrode disposed between the first internal capacitor electrode and the first external terminal electrode, and the second internal relay electrode disposed between the second internal capacitor electrode and the second external terminal electrode, the electric current path within the multilayer capacitor can be made longer and the ESR of the multilayer capacitor is thus significantly increased; that is, ESR control can be exercised properly. Moreover, although the first internal relay electrode and the second internal relay electrode each have an inductance, since they are arranged so as to be opposed to each other with the dielectric layer interposed therebetween, it follows that the inductance of the first internal relay electrode and the inductance of the second internal relay electrode cancel each other out. This makes it possible to keep the level of ESL low in the multilayer capacitor as a whole.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A multilayer capacitor comprising:
a multilayer body of rectangular parallelepiped shape constructed by stacking a plurality of rectangular dielectric layers on top of one another in a stacking direction;
a first internal capacitor electrode and a second internal capacitor electrode, which are disposed in a plural number, arranged in an alternating manner so as to be opposed to each other, with the dielectric layer interposed therebetween inside the multilayer body, the first internal capacitor electrode and the second internal capacitor electrode each having capacitor electrode lead-out portions led out to a left-hand surface and a right-hand surface, respectively, of the multilayer body that are perpendicular to the stacking direction and a direction parallel with a longitudinal direction of the dielectric layer;
a first external relay electrode formed on each of the left-hand surface and the right-hand surface of the multilayer body, to which is connected the capacitor electrode lead-out portion of the first internal capacitor electrode;
a second external relay electrode formed on each of the left-hand surface and the right-hand surface of the multilayer body, to which is connected the capacitor electrode lead-out portion of the second internal capacitor electrode;
a first internal relay electrode disposed between dielectric layers different from the dielectric layers corresponding to the first internal capacitor electrode and the second internal capacitor electrode inside the multilayer body, which has relay electrode lead-out portions led out to the left-hand surface and the right-hand surface, respectively, and connected to the first external relay electrode, and also has extension portions extended to an upper surface and a lower surface, respectively, of the multilayer body that are perpendicular to the stacking direction and a direction parallel with a width direction perpendicular to the longitudinal direction of the dielectric layer;
a second internal relay electrode disposed between dielectric layers different from the dielectric layers corresponding to the first internal capacitor electrode and the second internal capacitor electrode so as to be opposed to the first internal relay electrode, with the dielectric layer interposed therebetween, inside the multilayer body, which has relay electrode lead-out portions led out to the left-hand surface and the right-hand surface, respectively, and connected to the second external relay electrode, and also has extension portions extended to the upper surface and the lower surface, respectively, of the multilayer body;
a first external terminal electrode formed on each of the upper surface and the lower surface of the multilayer body, to which is connected the extension portion of the first internal relay electrode; and
a second external terminal electrode formed on each of the upper surface and the lower surface of the multilayer body, to which is connected the extension portion of the second internal relay electrode,
wherein only one of the two surfaces selected from the group consisting of the upper surface and the lower surface is configured for use as a mounting surface, wherein the mounting surface is opposed to a circuit board.

2. The multilayer capacitor of claim 1, wherein the first external terminal electrode and the second external terminal electrode, which are respectively disposed in a plural number, are arranged in an alternating manner.

3. The multilayer capacitor of claim 1, wherein the first internal capacitor electrode, the second internal capacitor electrode, the first internal relay electrode, and the second internal relay electrode are rotationally symmetrical with respect to an axis of symmetry passing through the center of front and rear surfaces of the multilayer body that are perpendicular to the stacking direction.

4. The multilayer capacitor of claim 1, wherein the first external relay electrode and the second external relay electrode are made smaller in width than the first external terminal electrode and the second external terminal electrode.

5. The multilayer capacitor of claim 1, wherein an interval between the first external relay electrode and the second external relay electrode is shorter than an interval between the first external terminal electrode and the second external terminal electrode.

6. The multilayer capacitor of claim 1, wherein a plurality of pairs of the first internal relay electrode and the second internal relay electrode are arranged at equally spaced intervals in the stacking direction of the multilayer body.

* * * * *